United States Patent
Peterson

(10) Patent No.: US 7,445,745 B2
(45) Date of Patent: Nov. 4, 2008

(54) METHOD FOR FABRICATING CERAMIC ARTICLES

(75) Inventor: Irene M. Peterson, Elmira Heights, NY (US)

(73) Assignee: Corning Incorporated, Corning, NY (US)

(*) Notice: Subject to any disclaimer, the term of this patent is extended or adjusted under 35 U.S.C. 154(b) by 290 days.

(21) Appl. No.: 10/911,083

(22) Filed: Aug. 3, 2004

(65) Prior Publication Data

US 2006/0027951 A1    Feb. 9, 2006

(51) Int. Cl.
*B28B 1/24* (2006.01)
*C04B 35/195* (2006.01)

(52) U.S. Cl. .................. 264/630; 264/631; 264/634

(58) Field of Classification Search ......... 264/630–631, 264/43, 497; 501/19, 301, 104, 113
See application file for complete search history.

(56) References Cited

U.S. PATENT DOCUMENTS

| | | | |
|---|---|---|---|
| 3,885,977 A * | 5/1975 | Lachman et al. .............. 501/80 |
| 5,252,272 A * | 10/1993 | Yavuz et al. ................. 264/630 |
| 6,132,671 A * | 10/2000 | Beall et al. .................. 264/630 |
| 6,132,832 A * | 10/2000 | Crichton et al. ............... 428/49 |
| 6,174,608 B1 | 1/2001 | Bertocchi et al. ........... 428/426 |
| 6,207,101 B1 * | 3/2001 | Beall et al. .................. 264/630 |
| 6,284,705 B1 | 9/2001 | Park et al. |
| 6,444,601 B1 | 9/2002 | Purcell, Jr. et al. |
| 6,544,913 B2 | 4/2003 | Kim et al. ..................... 501/32 |
| 6,743,383 B2 * | 6/2004 | Das et al. ................. 264/37.18 |
| 7,364,689 B2 * | 4/2008 | Noguchi et al. ............. 264/630 |
| 2003/0183988 A1 | 10/2003 | Das et al. .................... 264/601 |

OTHER PUBLICATIONS

"609 Active Minerals Co., LLC", 2003 AcerS Annual Meeting Expo Directory, Aug. 2, 2004, www.ceramicbulletin.org, p. 2.
"Acti-Gel 208", Active Minerals Company LLC, www.itcglobal. com, Jul. 29, 2004, pp. 1-2.
"Acti-Gel 208", Ceramic Materials.Info., Ceramic Materials Database, Jul. 29, 2004, pp. 1-3.

(Continued)

*Primary Examiner*—Carlos Lopez
(74) *Attorney, Agent, or Firm*—Joseph M. Homa; Randall S. Wayland; Anca C. Gheorghiu

(57) ABSTRACT

A method for fabricating a ceramic article which includes providing a batch comprising components of (i) a mixture of inorganic raw materials comprising talc, alumina, and silica; (ii) a binder comprising a water-soluble organic binder and a fibrous silicate mineral having a high aspect ratio in combination with a large surface area that is highly charged and has a strong interaction with a polar solvent, and is further characterized by a median particle size of 1-2 microns; and (iii) a polar solvent; mixing the batch components to form a homogenous and plasticized mass; shaping the plasticized mass into a green body wherein the green body has improved strength in a temperature region between 300°-900° C. to resist cracking during subsequent sintering; and, sintering the green body by heating to a temperature and for a time to initiate and sufficiently achieve conversion of the green body into a fired ceramic article.

14 Claims, 2 Drawing Sheets

OTHER PUBLICATIONS

"Attapulgite", Ceramic Materials.Info., Ceramic Materials Database, Jul. 29, 2004, p. 1.

Active Minerals Company, "Acti-Gel™ 208", Technical Data Sheet, Typical Properties http://www.itcglobal.com/activeminerals.com, Aug. 16, 2005.

Active Minerals Co. LLC (a division of ITC, Inc.), "Acti-Gel™ 208", PowerPoint presentation done by Alfred University, Alfred, NY, Apr. 2001.

Oral Communication dated Jan. 3, 2007, U.S. Appl. No. 11/197,050, filed Aug. 3, 2005.

* cited by examiner

METHOD FOR FABRICATING CERAMIC ARTICLES

BACKGROUND OF INVENTION

The present invention relates generally to a method for fabricating ceramic articles from moldable powdered mixtures that are formed by mixing inorganic particulate raw materials with a binder system that includes a water-soluble organic binder and an inorganic binder, and water as a solvent. The method particularly relates to the manufacturing of cordierite articles having improved strength in a temperature region between 300° C.-900° C. to resist cracking and damage during sintering.

Popular cellular ceramic monoliths which are generally formed by extrusion, such as cordierite honeycomb substrates which find applications in catalytic converters, diesel particulate filters, electrically heated catalyst, and chemical processing catalyst, require binders and other similar aids for proper processing. Typically, the binder which is an organic material must meet a number of requirements.

For example, the binder must be compatible with the ceramic material such that a flowable dispersion comprising a relatively high loading of the ceramic material in the binder may be provided. Also, the "green" perform produced by shaping the dispersion of ceramic powder in the binder should have reasonable strength such that it can be handled.

For desirable burnout, the binder should be removable from the shaped ceramic part without incurring distortion or breakage of the part. Also, the binder-free perform should be strong enough to undergo defect-free consolidation. The formulations of binders meeting these requirements is complex and a large number of different binder formulations are known in the art.

Typically, water-soluble cellulose ether binders are used for cordierite-forming batches. These binders result in subsequently formed green bodies having good "wet" strength, as well as good integrity in size and shape. "Wet" strength is used to describe the strength of the body after extrusion but before drying. "Green" strength refers to the strength of the body after drying but before firing.

Cellulose ether binders which burnout in the temperature region between 100° C.-600° C., and more specifically around 300° C., are difficult to remove without incurring distortion or breakage of the ceramic part. Removal of organic components during firing involves a sequence of simultaneous reactions which are fairly complex, including, for example, oxidation, volatilization, and thermal degradation.

Therefore, the major obstacle in working with plasticized mixture including organic binders is that the subsequently formed green ceramic article cracks when fired, particularly in thin walled-honeycomb structures. The cracking is a result of internal stresses developed during the removal of large amounts of organics which causes excessive temperature or pressure gradients internal to the bodies.

Accordingly, special consideration must be undertaken during firing to avoid cracking of the ceramic body. Long and complicated firing cycles, specially designed kilns, and similar means have been used to control the burnout of organic binders and reduce the thermal stresses, differential shrinkage and high cracking frequency. These methods however, require expensive and sophisticated equipment and increase the cost of firing and manufacturing.

In light of the foregoing problems experience in the art, there remains a need for a method of fabricating ceramic articles, and in particular cordierite ceramic bodies having improved strength in the temperature region between 300° C.-900° C. to withstand the thermal stresses and shrinkage which form in the body during sintering from organic burnout, therefore, such articles being able to be fired with less cracks and defects, in a cost-effective and efficient manner.

SUMMARY OF INVENTION

In the practice of the present invention there is provided a method for fabricating a ceramic article by providing a batch comprising powdered inorganic raw materials, binder, and solvent. The binder includes a water-soluble organic binder, such as cellulose ether binder, and a fibrous silicate mineral having a high aspect ratio in combination with a large surface area that is highly charged and has a strong interaction with a polar solvent, and is further characterized by a median particle size of 1-2 microns. A suitable polar solvent is water.

In one embodiment the inorganic powder materials are a mixture of cordierite-forming raw materials and include silica, talc, alumina, optionally clay and other cordierite-forming raw materials, each of the raw materials present in an effective amount which in combination with the other batch components, are capable of yielding a fired ceramic article whose main phase is cordierite.

The batch components are mixed together to form a homogeneous and plasticized mass, which is then shaped into a green body. The shaping can be performed according to any known method in the art. In one embodiment the green body is a honeycomb monolith. To form such a structure the plasticized mass is extruded through a honeycomb die. Finally, the green body is sintered to a temperature and for a time to initiate and sufficiently achieve the conversion of the green body into a fired ceramic article.

It has been found that by using organic and inorganic components for the binder, ceramic articles of the type described can be fired faster with less or no cracks. In particular the green bodies have improved strength in a temperature region between 300° C. to 900° C., and are therefore more resistant and less susceptible to cracking and being damaged during subsequent sintering.

BRIEF DESCRIPTION OF DRAWINGS

A complete understanding of the present invention may be obtained with reference to the accompanying drawings, when considered in conjunction with the subsequent detailed description, in which.

DESCRIPTION OF INVENTION

Figure 1:
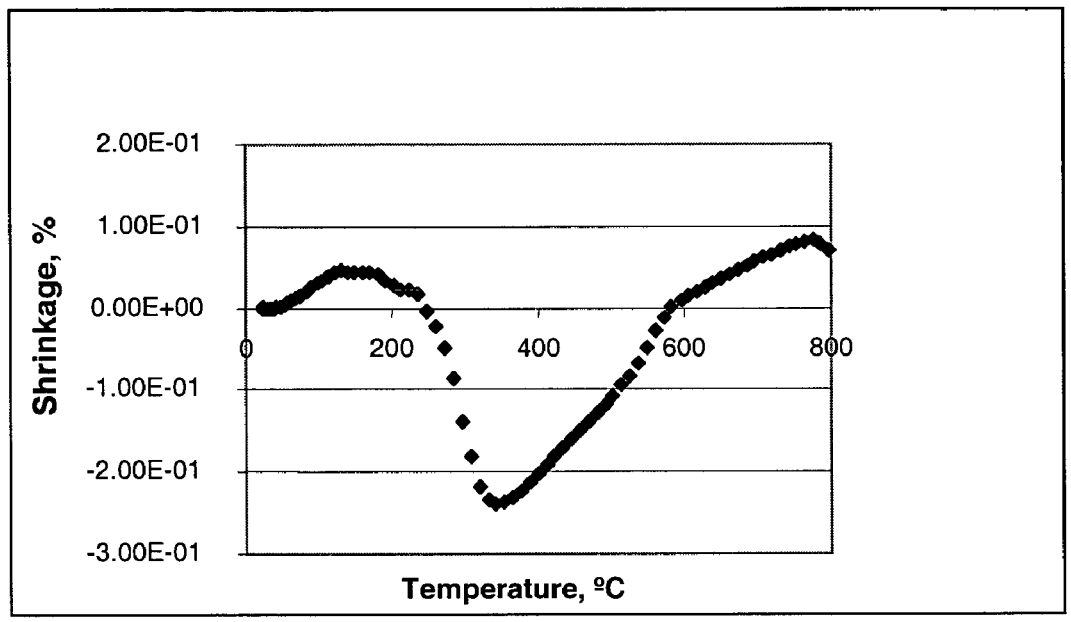
FIG. 1 is shows shrinkage as a function of temperature up to 800° C. for a green cordierite sample extruded without attapulgite clay; and, FIG. 2 shows shrinkage as a function of temperature up to 800° C. for a green cordierite sample extruded with 5% by weight attapulgite clay.

The invention is applicable to ceramic powder processing for the fabrication of shaped articles from moldable batches including inorganic raw materials, binder, and solvent. However, the invention is particularly suitable to the formation of ceramic articles which contain cordierite, and/or mullite. Examples of such ceramic articles include mixtures of 2-60% mullite, and 30-97% cordierite, with allowance for other phases, typically up to 10% by weight.

Some ceramic batch material compositions for forming cordierite that are especially suited to the practice of the present invention are those disclosed in U.S. Pat. No. 6,541, 407 which is herein incorporated by reference as filed. An embodiment of a ceramic material which ultimately forms cordierite upon firing is provided as follows (in percent by weight, assuming 100% by weight): 33 to 41% of aluminum oxide, 46 to 53% of silica, and 11 to 17% magnesium oxide.

The inorganic raw materials used in the batch composition can be synthetically produced materials such as oxides, hydroxides, and the like, or they can be naturally occurring minerals, such as clays, talcs, or any combination of these. The invention is not limited to the types of powders or raw materials. These can be chosen depending on the properties desired in the body.

Suitable cordierite-forming inorganic ceramic powder raw materials for the purpose of forming cordierite-containing ceramic articles may be selected from any source, and preferably include high-purity talc, silica, alumina, clay, and magnesia-yielding raw materials. Preferred raw materials are talc, alumina and silica.

The talc has a median particle size (MPS) greater than 15 microns (Mm) by less than 35 microns. It ha a platelet morphology to promote low CTE in the sintered ceramic article. A suitable morphology index for the talc (i.e., a measure of the degree of platiness of the talc) is greater than 0.75, as further described in U.S. Pat. No. 5,141,686. Alumina is used as a source for various suitable kinds such as alpha-alumina, gamma-alumina, rho-alumina, aluminum hydroxide, boehmite, and mixtures thereof. The alumina has a median particle size of between 5 and 25 microns. Silica includes but is not limited to quartz, cristobalite, non-crystalline silica such as fused silica or a sol-gel silica, zeolite, diatomaceous silica, and combinations thereof. The silica has a median particle size of between 10 and 35 microns. Optionally, the inorganic raw materials may include a clay such as kaolin.

The binder in the present invention includes a water-soluble organic binder, such a cellulose ether binder, and an inorganic component. The inorganic component is a fibrous silicate mineral having a high aspect ratio in combination with a large surface area that is highly charged and has a strong interaction with a polar solvent (e.g., water), and is further characterized by a median particle size of 1-2 microns.

For cordierite-forming batches suitable fibrous silicate mineral is attapulgite clay which is a hydrated magnesium aluminosilicate clay. Attapulgite clay has fiber or needle-like particles, which are very fine providing a high aspect ratio and a large surface area. Typically the aspect ratio is at least 500. A source for this material is available under the trade name of Acti-gel™ 208 from Active Materials Company (Hunt Valley, Md.). The fibrous silicate mineral is added to the batch in an amount of at least 2.0% by weight, but no more than 10.0% by weight, preferably at least 5.0% by weight, but no more than 10.0% by weight.

Suitable cellulose ether binders are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited with methylcellulose, hydroxypropyl methylcellulose, or combinations of these being preferred (available as Methocel™, Dow Chemical Co.).

The organic binder is added in amount of between 2.5 to 10.0% by weight, with between 2.5 to 5.0% by weight being a preferred range. If the organic binder content is too low, the plasticity of the batch may be compromised which may lead to cracking during extrusion as the batch cannot stretch without breaking. The organic binder is added as a super-addition to the inorganic raw materials of the powdered mixture. By super-addition is meant that to 100 grams of inorganic raw material mixture are added for example between 2.5 to 10 grams of metal oxide.

The binder system and powder materials are mixed with a solvent, such as water, which wets the powder materials and provides a medium for the binder to dissolve in thus providing plasticity to the batch. The batch may also include other organic or inorganic components which are used as optional processing aids. These include surfactants, lubricants, dispersants, oils and the like. An oil component provides fluidity necessary for shaping of the mixture, while maintaining the strength of the binder in the solvent. Suitable oils include paraffinic oils, such as mineral oils, hydrogenated polybutenes, alpha olefins, internal olefins, polyphenyl ethers, polybutenes, and polyisobutylene.

A surfactant if present, promotes emulsification between the solvent and the oil component. It disperses or wets the inorganic powders. Typically, the surfactant by itself without other substances, is insoluble in the solvent at room temperature. Suitable surfactants are oleic acid, lauric acid, stearic acid and combinations of these. A lubricant aids in the formation of a plasticized batch as known in the art. A suitable example of such a component is sodium stearate.

The batch may also include a pore former which is any particulate substance (not a binder) that burns out of the green body in the firing step. Suitable types of pore formers include graphite, cellulose, flour, and the like. Graphite is preferred because it has the least adverse effect on the processing.

In the preparation of ceramic bodies according to the present invention a moldable batch is prepared by mixing the powdered raw materials with the binder system and the other optional components to form a plasticized mixture. The batch components are mixed in any desired amounts selected.

In one embodiment the batch includes 100% by weight cordierite-forming inorganic raw materials, 2.0 to 10.0% by weight attapulgite clay, and based on 100% by weight cordierite-forming raw materials, 2.5 to 10% by weight methylcellulose, up to and including 1% by weight sodium stearate, up to and including 10% by weight graphite, and 25.0 to 40.0% by weight water, as solvent.

In another embodiment the moldable powder includes 100% by weight cordierite-forming inorganic raw materials, 5.0 to 10.0% by weight attapulgite, and based on 100% by weight cordierite-forming raw materials 2.5 to 5.0% by weight methylcellulose, up to and including 1% by weight sodium stearate, up to and including 10% by weight graphite, and 25.0 to 40.0% by weight water, as solvent.

The individual components of the binder system are mixed with the ceramic powder material, the other optional batch components and an adequate amount of solvent (i.e., water) to form a homogenous and formable mixture. Particularly, in the case of batches for ceramic products, the batch formation takes place in two stages prior to the shaping step. In the first stage or wetting stage of batch formation, the ceramic materials along with the binder components and other dry components are dry mixed followed by addition of the water. The mixing can take place for example in a Littleford mixer, as known in the art.

The second stage involves plasticization of the batch. Typically the wet mix from the first stage is sheared in any suitable mixer in which the batch will be plasticized, such as for example in a twin-screw extruder/mixer, auger mixer, muller mixer, or double arm, etc.

The resulting plasticized mixture is then shaped into a green body by any known method for shaping plasticized mixtures, but is best suited for extrusion through a die. The extrusion operation, either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The extruded green body is then dried according to conditions well known in the art, and fired at a selected temperature under suitable atmosphere and for a time dependent upon the composition, size and geometry so as to result in a ceramic article of the desired ceramic. For example, for a composition which is primarily for forming cordierite honeycomb structures, the subsequently formed parts are typically fired at a rate of between 15-100° C. per hour to a maximum temperature of between 1405-1430° C. with the holding times at these temperatures ranging from about 6-25 hours. Firing times and temperatures depend upon factors such as kinds and amounts of materials and the type of equipment utilized.

In one embodiment ceramic article of the present invention are honeycomb substrates composed of a cordierite-ceramic body. Honeycomb structures are well known in the art. They are designed to have an inlet end or face through which the exhaust gas enters the body, and an outlet end or face opposite the inlet end, the exhaust gas exiting the body at the outlet end.

A multiplicity of cells extend between the inlet and outlet ends, the cells having porous walls. For purposes of a diesel particulate filter, part of the total number of cells at the inlet end are plugged along a portion of their lengths, and the remaining part of the cells that are open at the inlet end are plugged at the outlet end, so that exhaust passing through the cells of the honeycomb flows into the open cells, through the cell walls, and out of the structure through the open cells at the outlet end.

The benefits and advantages of the present invention include: (1) a green body that has good wet strength and shape retention after exiting the die; (2) a green body that has improved and increased strength in a temperature region between 300° C. to 900° C. to withstand thermal stresses and differential shrinkage during sintering, especially in the beginning of the firing cycle, where the organics in the batch are removed or burned-off; (3) being able to employ shorter firing cycles; (4) a more efficient and cost-effective manufacturing process; and, (5) less wasted ware.

The instant invention is thus suitably applied to the fabrication of complicated formed ceramic bodies, especially cordierite, that are usually formed by extrusion, and to the manufacture of the corresponding fired bodies such as multicellular honeycomb structures having a high cell density and exhibiting thin cell wall dimensions.

To more fully illustrate the invention the following non-limiting examples are provided.

EXAMPLES

Samples are prepared according to the compositions provided in Table I below. The dry ingredients are weighed, and mixed with water and other batch components, followed by kneading in a stainless steel muller to form a plasticized batch which is then extruded into cellular honeycomb bodies consisting of multiple parallel channels of square cross section. The cellular bodies contain approximately 200 cells per square inch (csi) and have a wall thickness of 0.019 inches.

TABLE I

| Raw Materials | 1 Comp Wt % | 2 Inv Wt % | 3 Inv Wt % | 4 Inv Wt % | 5 Inv Wt % | 6 Inv Wt % | 7 Inv Wt % |
| --- | --- | --- | --- | --- | --- | --- | --- |
| Talc (MPS = mm) | 39.96 | 39.16 | 37.99 | 36.02 | 39.16 | 37.99 | 36.02 |
| $\alpha$-Al$_2$O$_3$ (MPS = mm) | 21.54 | 21.14 | 20.79 | 20.32 | 21.14 | 20.79 | 20.32 |
| Al(OH)$_3$ (MIPS = mm) | 16.35 | 16.35 | 16.02 | 15.35 | 16.35 | 16.02 | 15.35 |
| Silica (Quartz) (MPS = mm) | 22.15 | 21.35 | 20.20 | 18.31 | 21.35 | 20.20 | 18.31 |
| Acti-gel 208 ® (Attapulgite Clay) | 0.00 | 2.00 | 5.00 | 10.00 | 2.00 | 5.00 | 10.00 |
| Methocel ™ F240M (Methylcellulose) | 5.00 | 5.00 | 5.00 | 5.00 | 2.50 | 2.50 | 2.50 |
| Graphite (MPS = mm) | 10.00 | 10.00 | 10.00 | 10.00 | 10.00 | 10.00 | 10.00 |
| Sodium Stearate | 1.00 | 1.00 | 1.00 | 1.00 | 1.00 | 1.00 | 1.00 |
| Water | 40 | 40 | 40 | 40 | 40 | 40 | 40 |

After drying the parts are fired according to a predetermined firing cycle up to a maximum temperature of 1425° C. and held there for 15 hours. The cellular bodies are approximately 5.66 inches in diameter and were cut to be 10 inches in length. After firing, the samples are visually inspected for cracks, and characterized for the coefficient of thermal expansion (CTE) as measured by dilatometry between room temperature (RT) and 975° C., and modulus of rupture (MOR) strength as measured in a four point bend test on cylindrical rods or cellular bars. CTE is provided in units of $10^{-6}$ °C$^{-1}$. The MOR is measured at 400° C. and 800° C. to determine the strength of the samples at high temperatures. MOR is provided in units of pounds per square inch (psi). The measured properties are provided in Table II below.

TABLE II

| Properties | 1 Comp | 2 Inv | 3 Inv | 4 Inv | 5 Inv | 6 Inv | 7 Inv |
| --- | --- | --- | --- | --- | --- | --- | --- |
| MOR @ 400° C. (psi) | 5* | 179 | 301 | 579 | 165 | 387 | 522 |
| MOR @ 800° C. (psi) | 5* | 180 | 301 | 715 | 182 | 500 | 462 |
| CTE (RT-975° C.) ($10^{-6}$ °C.$^{-1}$) | 0.93 | 1.07 | 1.01 | 1.13 | 0.98 | 1.15 | 1.22 |
| Cracks | Many | None | None | None | None | None | None |

*measurements taken on cellular bars

Rod samples of the comparative (Comp) sample were so weak at both 400° C. and 800° C. that they crumbled before any measurement could be taken. MOR measurements on cellular bars indicated readings of 5 psi, the values which are reported in Table II.

The inventive (Inv) samples show that the use of attapulgite clay in combination with methylcellulose in the processing of cordierite bodies, provides an improvement in the high temperature green strength at both 400° C. and 800° C., such during subsequent sintering the bodies can resist the thermal stresses that are likely to lead to cracking during firing. Consequently, the inventive samples all survived firing without cracking. Whereas, the comparative sample cracked.

FIG. 1 shows shrinkage as measured up to 800° C. for comparative sample 1 which is processed without attapulgite clay. Between about 275-590° C. there occurs a large shrinkage event which is associated with the burnout of the methylcellulose binder. It is believed that the thermal gradients and stresses resulting from this shrinkage event cause the sample to crack, as it does not have the high temperature green strength to accommodate this large dimensional change.

Figure 2:
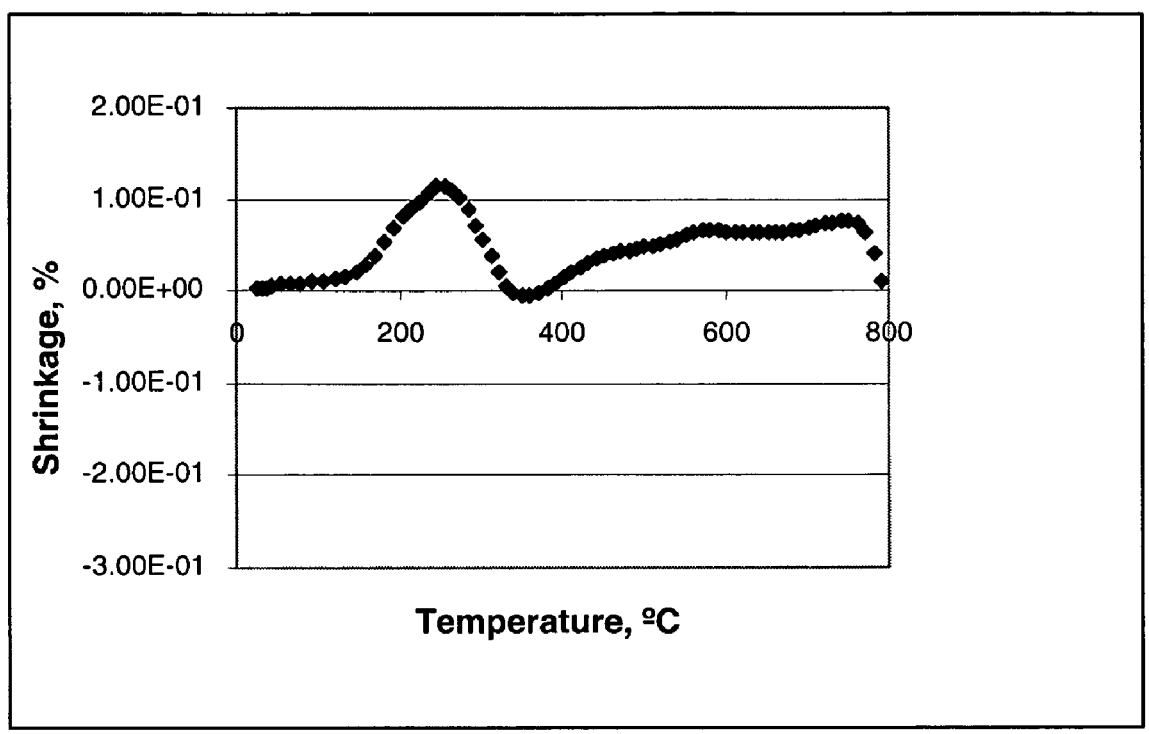

Referring now to FIG. 2 therein illustrated is the shrinkage as measured up to 800° C. for inventive sample 3 which is processed with 5% by weight attapulgite clay binder. In comparison with FIG. 1, the dimensional changes occurring between about 275-590° C. are greatly reduced. Therefore, it is believed that inventive sample 3 did not crack because of this reduction in dimensional change in combination with the increased strength in the aforementioned temperature region.

It has also been observed that the CTE of the inventive sample increases slightly with increasing amount of the attapulgite clay. However, by adding no more than 10 % by weight of this material as described above, the resulting CTEs are still within useful limits for the intended use of honeycombs in catalytic converters, diesel particulate filters, and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for fabricating a ceramic honeycomb article comprising:
   a. providing a batch comprising components of (i) a mixture of inorganic raw materials comprising talc, alumina, and silica; (ii) a water-soluble organic binder and a fibrous silicate mineral having a median particle size of 1-2 microns; and (iii) a polar solvent;
   b. mixing the batch components to form a homogenous and plasticized mass;
   c. shaping the plasticized mass into a green body wherein the green body is a honeycomb structure; and,
   d. sintering the green body by heating to a temperature and for a time to initiate and sufficiently achieve conversion of the green body into a fired ceramic article.

2. A method according to claim 1 wherein the inorganic raw materials are present in an effective amount which in combination with the other batch components are capable of yielding a fired ceramic article whose main phase is cordierite.

3. A method according to claim 1 wherein the organic binder is a cellulose ether binder.

4. A method according to claim 3 wherein the cellulose ether binder is methylcellulose binder.

5. A method according to claim 4 wherein the methylcellulose binder is added in an amount of 2.5-10% by weight super-addition.

6. A method according to claim 1 wherein the methylcellulose binder is added in an amount of 2.5-5% by weight super-addition.

7. A method according to claim 1 wherein the fibrous silicate mineral is attapulgite clay.

8. A method according to claim 1 wherein the fibrous silicate mineral is added in an amount of 2-10% by weight.

9. A method according to claim 8 wherein the fibrous silicate mineral is added in an amount of 5-10% by weight.

10. A method according to claim 1 wherein the batch includes other optional organic and inorganic components to be used as processing aids.

11. A method according to claim 10 wherein the batch includes a surfactant and a pore former.

12. A method according to claim 1 wherein the batch comprises 100% by weight cordierite-forming inorganic raw materials, 2.0 to 10.0% by weight attapulgite clay, and based on 100% by weight cordierite-forming raw materials 2.5 to 10% by weight methylcellulose, up to and including 1% by weight sodium stearate, up to and including 10% by weight graphite, and 25.0 to 40.0% by weight water, as solvent.

13. A method according to claim 12 wherein the batch comprises 100% by weight cordierite-forming inorganic raw materials, 5.0 to 10.0% by weight attapulgite clay, and based on 100% by weight inorganic raw materials 2.5 to 5.0% by weight methylcellulose, up to and including 1% by weight sodium stearate, up to and including 10% by weight graphite, and 25.0 to 40.0% by weight water, as solvent.

14. A method according to claim 1 wherein the fibrous silicate mineral has an aspect ratio of at least 500.

* * * * *

UNITED STATES PATENT AND TRADEMARK OFFICE
CERTIFICATE OF CORRECTION

PATENT NO.        : 7,445,745 B2
APPLICATION NO.   : 10/911083
DATED             : November 4, 2008
INVENTOR(S)       : Irene Mona Peterson et al.

Page 1 of 1

It is certified that error appears in the above-identified patent and that said Letters Patent is hereby corrected as shown below:

Title Page, Item (56)

2nd page of "OTHER PUBLICATIONS", "Oral Communication" should read --Office Communication--.

Signed and Sealed this

Ninth Day of June, 2009

JOHN DOLL
*Acting Director of the United States Patent and Trademark Office*